2,899,467

SURFACE HYDRATED CITRIC ACID CRYSTALS

Edward L. Brennan, Baldwin, Bernard J. Quinn, Garden City, and Robert S. Sellers, Huntington, N.Y., and Gilbert C. Wagner, Leonia, N.J., assignors to Chas. Pfizer & Co., Inc., New York, N.Y., a corporation of Delaware No Drawing. Application August 2, 1957
Serial No. 675,812

3 Claims. (Cl. 260—535)

This invention is concerned with a process for the preparation of a new form of citric acid. More particularly, it is concerned with a method of producing a confectionery grade of citric acid.

The use of citric acid in the manufacture of confectioneries is a well-known, established practice. Particularly, in the manufacture of so-called hard candies the citric acid performs certain necessary functions one of which is to act as an acidulent in enhancing the flavor of the candy.

The citric acid crystals are melted into a molten mass of carbohydrate and other materials, commonly employed in hard candy manufacturing, at a temperature of from about 90° C. to about 110° C. Complete blending of the citric acid crystals into the candy mass insures uniform distribtuion of the accidulent. In order to perform this function, the physical state of citric acid must be of proper grain size and of a certain state of hydration. By proper grain size is meant a state of division of the citric acid which most efficiently fuses into the candy mass. The crystal size should be of U.S. Standard sieve size of from about 60 to 100. By a certain state of hydration is meant hydration which results in a hydrated form of citric acid of melting point low enough to fuse into a hot candy mix without releasing significant amounts of moisture. When the monohydrate of citric acid is used for candy manufacture, the moisture released on fusion causes sticking of the candy to punch machines used in processing and imperfect printing of the brand name on the candy product. Anhydrous acid, on the other hand, does not readily melt into the hot candy mass the temperature of which ranges from about 90° to about 110° C., and cannot be used efficiently. Half-dehydrated citric acid monohydrate on the other hand does not melt low enough to be efficiently distributed throughout a hot candy mass. This is apparently due to surface dehydration of the crystals of monohydrated citric acid during the dehydration process.

It has now been found that a new process for the partial hydration of anhydrous citric acid results in a product which is of such particle size and water content as to be of initial melting point low enough to permit ready fusion with hot candy masses without the release of too much moisture.

The new partial hydration of anhydrous citric acid is accomplished by contacting fine, granular anhydrous citric acid U.S.P., of U.S. Standard sieve size from 60 to 100 with water in such a way as to coat each crystal with a layer of water. This is effected by treating citric acid crystals, with a fine spray of from about 3% to about 6% by weight of water while constantly agitating the mixture to provide a state of fine subdivision and minimize agglomeration. The water employed is sufficiently pure, that is free of contaminants, as to be suitable for human consumption and, at the same time, not to reduce the purity of the citric acid employed in this hydration process. Because of the frictional effects of agitation and the heat of hydration, the hydration mixture must be cooled in order to maintain the temperature below the critical temperature of hydration, which lies between 35° C. and 41° C. External water-cooling of the hydration mixture is found efficient in maintaining the temperature below 35° C. although other cooling methods may be employed. Temperatures from about 0° to 35° C. are suitable but the preferred temperature is from 5° to about 25° C. It is found that the partial hydration proceeds rapidly at lower temperatures of the above mentioned range, particularly below 10° C. where the hydration is completed in relatively short periods of time.

It has been found that this hydration may also be carried out in batch quantity production by adding the required weight of water to anhydrous citric acid in a suitable container which is rotated or otherwise agitated to induce uniform consistency of the mixture which is then allowed to stand for about 12 hours at a temperature from 0° to 35° C. after which the partially hydrated citric acid is ready for use. Cooling the hydration mixture is not always found necessary in this modification of the method, since continuous agitation is not employed. When a solid-liquid blender is used, since continuous agitation produces frictional heat, water cooling is found necessary.

The added amount of water used in the hydration process is approximately from 3% to about 6% by weight of anhydrous citric acid. The wetted crystals of citric acid then dry by surface hydration of the crystals resulting in a hydrated surface and substantially anhydrous core of the citric acid crystals, which increase to some extent in size due to water absorption. The partially hydrated form of citric acid which results from this process usually contains some agglomerates of crystals which may be readily separated by screening. The assay of the partially hydrated acid shows from about 3% to about 6% by weight of water.

These surface-hydrated crystals are unique in their application to the production of confectionery products, particularly hard candy, in that they fuse at sufficiently low temperature to readily mix into the hot candy mass without the release of significant moisture.

The following examples are given solely for the purpose of illustration and are not to be construed as limitations of this invention, many variations of which are possible without departing from the spirit or scope thereof.

*Example I*

Ten pounds of distilled water were added to 200 pounds fine granular anhydrous citric acid of U.S. Standard sieve size ranging from 60 to 100 in a polyethylene lined fibre drum. This was thoroughly mixed by rolling the drum which was then allowed to stand at room temperature for 12 hours. The dry mixture was then sifted to remove the agglomerates. The assay of the hydrated acid crystals of sieve size from 60 to 100 indicated 4.5% by weight of water of hydration.

*Example II*

Seven pounds of distilled water were added to 200 pounds fine granular anhydrous citric acid of U.S. Standard sieve size ranging from 60 to 100 in a polyethylene lined fibre drum. This was thoroughly mixed by rolling the drum which was then allowed to stand at room temperature for 12 hours. The dry mixture was then sifted to remove the agglomerates. The assay of the hydrated acid crystals of sieve size from 60 to 100 indicated 3% by weight of water of hydration.

Example III

Fourteen pounds of distilled water were added to 200 pounds fine granular anhydrous citric acid of U.S. Standard sieve size ranging from 60 to 100 in a polyethylene lined fibre drum. This was thoroughly mixed by rolling the drum which was then allowed to stand at room temperature for 12 hours. The dry mixture was then sifted to remove the agglomerates. The assay of the hydrated acid crysals of sieve size from 60 to 100 indicated 6% by weight of water of hydration.

Example IV

Example II was repeated using a Patterson-Kelly Solid-Liquid blender which was externally water-cooled. This apparatus is a twin-shell blender with an internal liquid disperser ring and an agitator equipped with wires to break up agglomerates. Five hundred pounds of fine granular anhydrous citric acid of U.S. Standard sieve size from 60 to 100 was blended with about 25 pounds of water, added by means of the internal liquid disperser ring over a period of 5 to 10 minutes, after which agitation was continued until a dry product was obtained. The product assayed at 4.4 percent of water of hydration.

Example V

A half-pound of water was added to ten pounds of citric acid after precooling both reactants to 5° C. The mixture was agitated for uniform distribution of water and allowed to stand at this temperature. After one-half hour, the hydration was complete. The crystals assayed at 4.4% of water of hydration.

What is claimed is:

1. Surface hydrated crystals of finely-divided anhydrous citric acid of confectionery grade having a crystal size of U.S. Standard sieve from about 60 to about 100 and containing from about 3% to 6% by weight of water of hydration, the cores of said crystals being free of water of hydration and said crystals being blendable with molten candy to produce a homogenous substantially non-tacky product.

2. The process for producing a surface hydrated form of citric acid which comprises introducing water into intimate contact with finely-divided, substantially anhydrous citric acid at a temperature of from 0 to 35° C., the amount introduced being from 3 to 6% by weight of liquid water based on the weight of anhydrous citric acid present, and mixing said water and citric acid until a substantially uniform dry product is obtained.

3. The process of claim 2 wherein the temperature is from about 5 to about 25° C.

References Cited in the file of this patent

UNITED STATES PATENTS

| | | |
|---|---|---|
| 1,792,657 | Pasternack et al. | Feb. 17, 1931 |
| 1,921,634 | Pasternack et al. | Aug. 8, 1933 |